United States Patent [19]

Malachesky et al.

[11] 4,074,019
[45] Feb. 14, 1978

[54] CELL HAVING FLUORINATED CARBON CATHODE AND SOLVATED ALKALI METAL SALT ELECTROLYTE

[75] Inventors: Paul A. Malachesky, Berkeley Heights; Gerald H. Newman, Westfield, both of N.J.

[73] Assignee: Exxon Research & Engineering Co., Linden, N.J.

[21] Appl. No.: 773,283

[22] Filed: Mar. 1, 1977

[51] Int. Cl.$^2$ .................................. H01M 10/44
[52] U.S. Cl. .................................. 429/50; 429/191
[58] Field of Search .................... 429/50, 191, 218

[56] References Cited

U.S. PATENT DOCUMENTS

| | | | |
|---|---|---|---|
| 3,977,900 | 8/1976 | Luehrs | 429/191 X |
| 4,009,052 | 2/1977 | Whittingham | 429/191 |

*Primary Examiner*—C. F. LeFevour
*Attorney, Agent, or Firm*—Kenneth P. Glynn

[57] ABSTRACT

A novel electrochemical cell is disclosed utilizing an alkali metal anode, a fluorinated carbon cathode and a solid electrolyte consisting essentially of one or more solvated metal-alkali metal-halogen compounds of the formula $ZMX_n$ wherein Z is an alkali metal, M is a metal selected from the group consisting of Zn, Cd, B, Al, Ga, In, Tl, Sn (stannous), P and As, wherein X is one or more halogens selected from the group consisting of chlorine, fluorine, bromine and iodine, and wherein n is a numerical value equal to one plus the valence of the metal M. Preferred are the cells wherein the anode is lithium, the cathode is $C_2F$, and the electrolyte consists essentially of solid solvated metal-lithium-halogen salt.

13 Claims, 1 Drawing Figure

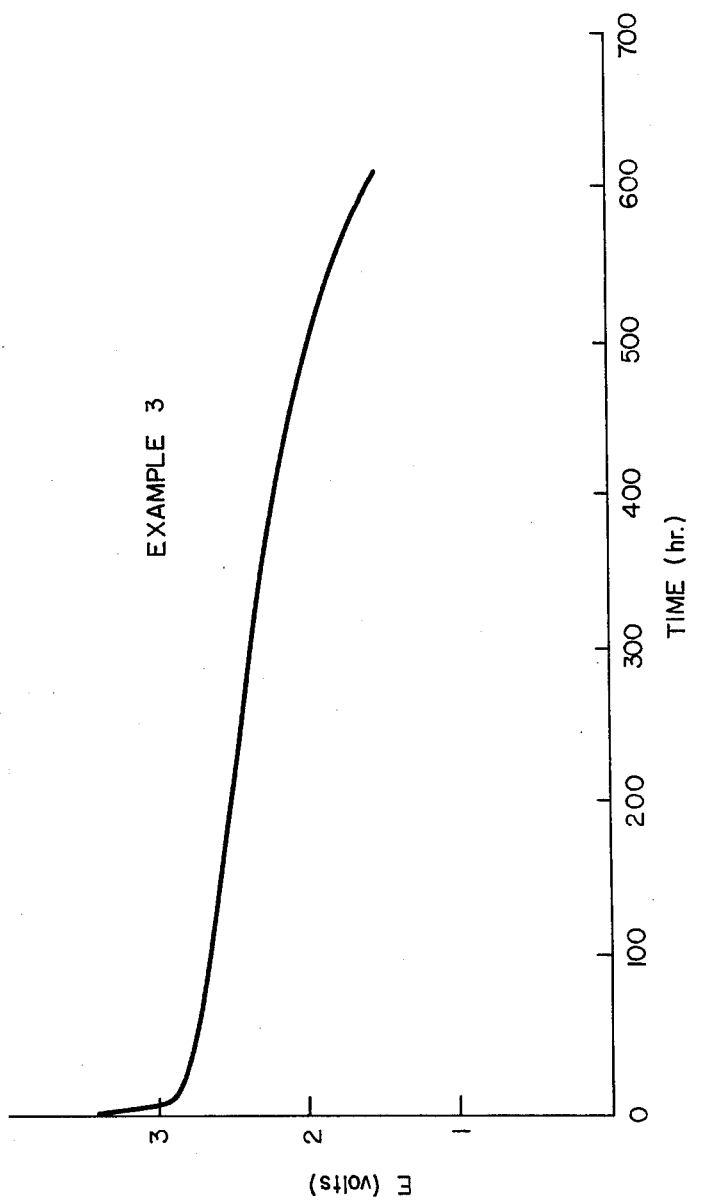

CELL HAVING FLUORINATED CARBON CATHODE AND SOLVATED ALKALI METAL SALT ELECTROLYTE

BACKGROUND OF THE INVENTION

1. Field of the Invention

This invention relates to a novel electric current-producing cell. More particularly, this invention relates to improvements in the electric current producing cells of the type comprising an alkali metal anode, a solid electrolyte, and a cathode of a fluorinated carbon material.

2. Description of the Prior Art

There has been considerable interest in recent years in developing high energy density electrochemical cell systems. Among the systems being investigated are those employing nonaqueous electrolytes including liquid and fused electrolytes, anodes containing lightweight metals, such as alkali metals, and cathodes containing compounds of carbon, e.g., fluorinated carbon compounds. Typical systems are described, for example, in U.S. Pat. Nos. 3,536,522 and 3,514,337.

Additionally, various efforts have been made to develop solid state electrolytes for high energy density electrochemical cell systems. Alkali metal-aluminum-halogen compounds have been utilized in liquid and molten state electrolyte systems (e.g., as described in U.S. Pat. Nos. 3,877,984 and 3,751,298), and solid alkali metal-aluminum-halogen compound conductivity studies have been made (e.g., N. I. Anufrieva et al, *Tseut. Metal.*, Vol. 1, pp. 32–36 (1973); W. Weppner et al, *Physics Letters*, Vol. 58A, No. 4, pp. 245–248 (1976); and J. Schoonman et al, *J. Solid Chem.*, Vol. 16, pp. 413–422 (1976)). Additionally, some solvent complexed alkali metal salts have been described as useful electrolytes (see U.S. Pat. Nos. 3,704,174 and 3,977,900, for example.) However, to date, there has been no suggestion that solvated metal-alkali metal-halogen compounds of the type employed in the present invention might be useful in solid state electrolyte systems having alkali metal anodes and fluorinated carbon cathodes.

SUMMARY OF THE INVENTION

A novel electric current-producing cell of the present invention has been developed which comprises: (a) a cathode comprised of fluorinated carbon; (b) an alkali metal anode; and (c) a solid electrolyte consisting essentially of one or more solvated metal-alkali metal-halogen compounds of the formula:

$$ZMX_n \qquad (1)$$

wherein Z is an alkali metal, M is a non-alkali type metal as more fully described below, X is one or more halogens and $n$ is a numerical value equal to one plus the valence of the metal M.

DETAILED DESCRIPTION OF THE INVENTION

The novel electric current-producing cell of the present invention is a solid state cell which contains an anode, a cathode and a solid electrolyte. By "solid state" cell is meant a cell from which electric current may be drawn at temperatures below the melting point of a solid electrolyte.

In the cell of the present invention, an anode is employed which contains an anode-active material selected from the alkali metals. Desirably the anode is substantially sodium, potassium, lithium or alloys containing these, and preferably the anode is lithium metal, or a lithium metal alloy. The alkali metal, for example lithium, may be in contact with other metal structures such as nickel, copper or silver screen, which serve as current collectors and are well-known in the art.

The cathode in the current-producing cell of the present invention is one which contains as its cathode-active material a compound of carbon and fluorine. Included are any of the well-known fluorinated carbon cathodes such as those prepared from any of the conductive carbons and especially the $(C_yF)_n$ types, where $y$ represents the atomic ratio of carbon to fluorine, e.g., a small fraction to an integer less than 10, and $n$ is the number of $(CF_y)$ units in the molecule, e.g., 1 to very large numbers. Among these, the $C_2F$ cathode is desirable in the cell of the present invention. Advantageously, the $C_2F$ cathode may be one which is formed by reacting a crystalline form of carbon such as natural or pyrolytic graphite, with an interhalogen fluoride in the presence of hydrogen fluoride. These interhalogen fluorides include those selected from $ClF_3$, $ClF_5$, $BrF_3$, $BrF_5$, $ICl$ and $IF_5$, particularly $ClF_3$. However, the cathode-active material may be prepared by any known method such as treatment of carbon with fluorine gas at elevated temperatures or simply by suspending the carbon, such as graphite, in liquid hydrogen fluoride and thereafter adding an interhalogen compound for a time sufficient for it to react with the carbon compound.

The electrolyte employed in the novel cell of the present invention is a solid electrolyte and consists essentially of one or more solvated compounds of the formula:

$$ZMX_n \qquad (1)$$

wherein Z is an alkali metal, M is a metal selected from the group consisting of Zn, Cd, B, Al, Ga, In, Tl, Sn (stannous), P and As, wherein X is one or more halogens selected from the group consisting of chlorine, fluorine, bromine and iodine, and $n$ is a numerical value equal to one plus the valence of the metal M and thus represents the number of halogen atoms present, i.e., three, four or six.

Desirably, the alkali metal Z in Formula (1) above is selected from sodium, lithium and potassium. Preferred is lithium.

The metal M in Formula (1) is any of zinc, cadmium, boron, aluminum, gallium, indium, thallium, tin (stannous), phosphorus and arsenic. Desirably, M is selected from the group consisting of boron, aluminum, phosphorus and arsenic. Preferably, M is selected from the group consisting of boron, phosphorus and arsenic.

The halogen X in Formula (1) is one or more selected from chlorine, fluorine, bromine or iodine and, therefore, in general, the compounds encompassed by Formula (1) above include those having more than one type of halogen atom, e.g., tetrachlorodibromo compounds of phosphorus and arsenic, dichlorodibromo compounds, trichlorofluoro compounds and the like. However, desirably all of the halogen atoms in the compounds are the same, i.e., X is a single halogen selected from the group consisting of chlorine, fluorine, bromine and iodine. Preferably X is chlorine or fluorine, particularly fluorine. Among the specific solid compounds which are included are: $LiZnCl_3$; $LiPF_6$; $LiAsF_6$; $LiBCl_4$; $LiBBr_4$; $LiBI_4$; $LiAlCl_4$; $LiAlBr_4$; $LiAlI_4$; $LiAlCl_3Br$; $NaAlCl_4$; $NaAlCl_3Br$; $NaAlBr_4$ and the like.

The most preferred compounds are $LiPF_6$; $LiAsF_6$ and $LiBF_4$, particularly $LiAsF_6$.

The electrolyte compound of Formula (1) may be prepared by reacting an alkali metal halide with a metal halide, for example, in solution with the hydrogen halide which corresponds to the alkali metal halide. The reaction may proceed at an acceptable rate at room temperature or may be enhanced by heating. Known techniques may be used to concentrate and/or separate the solid compound, as desired, for subsequent solvation. Alternatively, commercially available salts, e.g., anhydrous LiPF hd 6, could be used.

The solvent used in the solvation of the compound represented by Formula (1) above is generally an ether. Among the ethers which are useful are the unsubstituted and inertly substituted monoethers and polyethers. By "inertly substituted" ether is meant an ether containing substituents which have no detrimental effect on the solvation of the Formula (1) compound or on its use as an electrolyte. These ethers include dimethoxyethane (DME), 2-methoxyethyl ether (diglyme), triethylene glycol dimethyl ether (triglyme) and the like. Preferred is dimethoxyethane.

The metal-alkali metal-halogen compounds of the above formula are solvated with one or more solvents, as mentioned, by dissolving the compound in the desired solvent. The excess solvent is subsequently removed by known techniques, e.g., by vacuum, to yield the solid solvated electrolyte salt. For example, the solvated salt compounds may be formed by dissolving an anhydrous salt of the Formula (1) type, above, in pure solvent. It is useful, although not critical, to predry the salt prior to dissolving it in the solvent, e.g., by vacuum drying at an elevated temperature. Sufficient salt may be dissolved so as to obtain appreciable solvated salt product, and there is otherwise no criticality to the amount dissolved. As a practical matter, sufficient salt should be used to render the process economically attractive. There is no upper limit to the amount of salt dissolved into the solvent, except that amounts over the saturation level of the solvent will not necessarily be solvated. Of course, as solvated salt is formed in a given solution, more salt may be added to enhance further solvated salt production. In a preferred technique, sufficient salt is added to heated solvent so that the solution becomes saturated and the solution is then cooled to precipitate out solvated salt product. The solvated product may be separated by filtering, washed with an inert solvent, e.g., benzene, to remove excess solvent and/or vacuum dried with heat. Other techniques for obtaining the solid solvated salt electrolyte will be apparent to the artisan.

The solid solvated alkali metal salt electrolyte is subsequently formed into the desired shape by molding, pressing, rolling, binding with polymeric compounds which do not detrimentally affect the electrolyte activity of the electrolyte. In one embodiment, the electrolyte is rolled into or pressed into a thin sheet of about 10 mils or less. In another embodiment, the solid electrolyte may be melted and then cooled to form a glassy solid sheet. In any event, the electrolyte consisting essentially of one or more solvated Formula (1) type compounds may be formed into known solid electrolyte configurations for use in the electrochemical cell.

BRIEF DESCRIPTION OF THE DRAWING

FIG. 1 illustrates graphically the voltage-time behavior of a cell of the present invention which is described in more detail with respect to Examples 2 and 3 below.

The present invention is illustrated by the following examples, but the invention should not be construed as being limited thereto.

EXAMPLE 1

A solid state electrolyte consisting of dimethoxyethane solvated $LiAsF_6$ was prepared for testing. Commercially obtained pure anhydrous $LiAsF_6$ was dissolved in dimethoxyethane until a saturated solution was formed. The solvated $LiAsF_6$ salt was immediately formed and the excess dimethoxyethane was removed by vacuum to yield a solid electrolyte composition.

EXAMPLE 2

The solid state electrolyte prepared in accordance with Example 1 was used in a test cell as follows:

About 1.0 gram of the $LiAsF_6 \cdot DME$ was combined with 0.5 grams of an 85 weight percent $C_2F$, 10 weight percent Vulcan XC72 (a conductive carbon sold by Cabot Corporation of Boston, Mass.), 5 weight percent TFE mixture to form a cathode electrolyte mix. A paste was made using DME and placed in the bottom of a one-inch diameter tantalum can. The excess DME was evaporated off by means of a hot plate to yield a cathode-electrolyte cake. This was found to have a theoretical capacity of about 80 ma.hr of $C_2F$. A glass fiber disc (Gelman Type A/E, 18 mil. produced by Gelman Instrument Co. of Ann Arbor, Michigan) was then impregnated with molten $LiAsF_6 \cdot DME$ by dipping. The impregnated electrolyte disc was sandwiched in the tantalum can between the cathode-electrolyte cake and a 15 mil lithium sheet anode. The electrode area was determined to be about 5 $cm^2$ and the cell was found to have an open circuit voltage of 2.9 volts, measured at a temperature of 25°C.

The cell was then heated to insure good contact between the electrolyte/separator and the cathode-electrolyte cake by melting the $LiAsF_6 \cdot DME$ complex. An open circuit voltage of 3.65 volts, measured at a temperature of 25°C, was observed.

Using variable loads of 20k ohms to 1000k ohms, E-I data was obtained at selected temperatures, as shown in Table I:

Table I

| | E-I Data for Example 2 | | |
|---|---|---|---|
| Temperature (° C) | Ohmic Load (K Ohms) | I ($\mu A/cm^2$) | E (Volts) |
| 26 | 1000 | 0.6 | 3.05 |
| 26 | 500 | 1.1 | 2.72 |
| 26 | 200 | 2.0 | 2.08 |
| 26 | 100 | 3.0 | 1.49 |
| 26 | 50 | 3.8 | 0.96 |
| 30 | 1000 | 0.6 | 3.20 |
| 30 | 500 | 1.2 | 2.96 |
| 30 | 200 | 2.4 | 2.44 |
| 30 | 100 | 3.8 | 1.90 |
| 30 | 50 | 5.2 | 1.33 |
| 40 | 1000 | 0.7 | 3.35 |
| 40 | 500 | 1.3 | 3.23 |
| 40 | 200 | 2.9 | 2.95 |
| 40 | 100 | 5.2 | 2.59 |
| 40 | 50 | 8.4 | 2.10 |
| 50 | 1000 | 0.7 | 3.50 |
| 50 | 500 | 1.4 | 3.48 |
| 50 | 200 | 3.4 | 3.40 |
| 50 | 100 | 6.6 | 3.27 |
| 50 | 50 | 12.2 | 3.04 |

Table I-continued

E-I Data for Example 2

| Temperature (° C) | Ohmic Load (K Ohms) | I (μA/cm²) | E (Volts) |
|---|---|---|---|
| 50 | 20 | 25.0 | 2.50 |

The above data illustrates that cell performance improves considerably with rise in temperature. Further, it illustrates, unexpectedly, that the cell operates at current densities in the $\mu A/cm^2$ range, notwithstanding the fact that a relatively thick electrolyte layer was used.

EXAMPLE 3

The test cell described in Example 2 was discharged under a constant 1MΩ load. FIG. 1 shows the cell voltage-time behavior. Six hundred hours' operation were achieved to a 1.5V cut-off at ambient temperature.

EXAMPLE 4

A 0.455 inch diameter, 0.165 inch in height cell was constructed, using an 85 weight percent $C_2F$ pellet which contained 10 weight percent Vulcan XC-72 and 5 weight percent Teflon and weighed 0.150 g, equivalent to 60 mA-hr. of cathode capacity. The cathode pellet was placed in a tantalum can which served as the cathode collector. Two layers of glass fiber separator were placed against the cathode, and the cathode plus separator were impregnated with excess molten $LiAsF·DME$ Complex. A 60 mil thick lithium anode was pressed into a stainless steel lid which contained an overmolded gasket and a polypropylene layer of glass fiber pressed against the anode. The cell was then sealed, during which the excess $LiAsF_6·DME$ was forced into the anode separator. After sealing, the cell showed an open-circuit voltage of 3.43 V. The polarization data of Table II was then obtained:

Table II

| Cell Current, μA | Cell Voltage, Volts |
|---|---|
| 0 | 3.43 |
| 3 | 3.41 |
| 7 | 3.39 |
| 17 | 3.34 |
| 32 | 3.23 |
| 61 | 3.06 |
| 132 | 2.64 |
| 215 | 2.15 |

EXAMPLE 5

A cell was constructed as described in Example 4 using a 95 weight percent $CF_{0.85}$ pellet containing 5 weight percent TFE which weighed 0.160 g, equivalent to 138 mA-hr. of cathode capacity. The cell had an open-circuit voltage of 3.136 V and gave the polarization data of Table III, as follows:

Table III

| Cell Current, μA | Cell Voltage, Volts |
|---|---|
| 0 | 3.14 |
| 3 | 3.11 |
| 6 | 3.06 |
| 15 | 2.94 |
| 28 | 2.76 |
| 49 | 2.46 |
| 93 | 1.96 |
| 147 | 1.47 |

What is claimed is:

1. A current producing cell comprising:
   a. a cathode having a compound formed of fluorine and carbon;
   b. an alkali metal-containing anode; and
   c. a solid electrolyte consisting essentially of one or more solvated compounds of the formula:

$$ZMX_n$$

wherein Z is an alkali metal, wherein M is a metal selected from the group consisting of Zn, Cd, B, Al, Ga, In, Tl, Sn (stannous), P and As, wherein X is one or more halogens selected from the group consisting of chlorine, fluorine, bromine and iodine, and wherein n is a numerical value equal to one plus the valence of the metal M, said compounds having been solvated with one or more solvents selected from the group consisting of unsubstituted and inertly substituted monoethers and polyethers.

2. The cell of claim 1 wherein the anode is substantially sodium, lithium, potassium, or alloys containing these, and wherein Z is selected from the group consisting of sodium, lithium and potassium.

3. The cell of claim 2 wherein M is selected from the group consisting of B, Al, P and As.

4. The cell of claim 1 wherein the cathode is fluorinated crystalline carbon material.

5. The cell of claim 4 wherein the anode is substantially sodium, lithium, potassium, or alloys containing these, and wherein Z is selected from the group consisting of sodium, lithium and potassium.

6. The cell of claim 5 wherein M is selected from the group consisting of B, Al, P and As.

7. The cell of claim 6 wherein the cathode is $CF_2$, wherein the anode is substantially lithium, or a lithium alloy, and wherein X is selected from the group consisting of chlorine and fluorine.

8. An electric cell comprising:
   a. a cathode containing a cathode-active material formed by reacting graphite with chlorine trifluoride in the presence of HF;
   b. a lithium metal-containing anode; and
   c. a solid electrolyte consisting essentially of ether solvated $LiAsF_6$.

9. The cell of claim 8 wherein the $LiAsF_6$ has been solvated with dimethoxyethane.

10. A method of operating a current-producing cell, comprising:
    drawing a current from said cell at a temperature below the melting point of the electrolyte of said cell wherein said cell comprises a cathode having a compound formed of fluorine and carbon, an alkali metal-containing anode, and a solid electrolyte consisting essentially of one or more solvated compounds of the formula:

$$ZMX_n$$

wherein Z is an alkali metal, wherein M is a metal selected from the group consisting of Zn, Cd, B, Al, Ga, In, Tl, Sn (stannous), P and As, wherein X is one or more halogens selected from the group consisting of chlorine, fluorine, bromine and iodine, and wherein n is a numerical value equal to one plus the valence of the metal M, said compounds having been solvated with one or more solvents selected from the group consisting of unsubstituted and inertly substituted monoethers and polyethers.

11. The method of claim 10 wherein Z is selected from the group consisting of sodium, lithium and potassium, wherein M is selected from the group consisting of B, Al, P and As, and wherein X is a halogen selected from the group consisting of chlorine and fluorine.

12. The method of claim 11 wherein the anode is substantially lithium or a lithium alloy, and wherein Z is lithium.

13. The method of claim 12 wherein the solid electrolyte consists essentially of ether solvated $LiAsF_6$.

* * * * *